United States Patent
Dubhashi et al.

(10) Patent No.: US 6,583,682 B1
(45) Date of Patent: Jun. 24, 2003

(54) METHOD OF REDUCING CONDUCTED EMI IN MOTOR DRIVE APPLICATIONS

(75) Inventors: Ajit Dubhashi, El Segundo, CA (US); Bertrand Vaysse, West Hollywood, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 09/553,757

(22) Filed: Apr. 21, 2000

Related U.S. Application Data
(60) Provisional application No. 60/130,480, filed on Apr. 22, 1999.

(51) Int. Cl.[7] .................................................. H03H 7/01
(52) U.S. Cl. ........................ 333/12; 333/181; 333/185; 363/39
(58) Field of Search .......................... 333/12, 181, 182, 333/185, 177; 363/39, 47, 48

(56) References Cited

U.S. PATENT DOCUMENTS

| | | | | |
|---|---|---|---|---|
| 4,145,674 A | * | 3/1979 | King et al. | 333/181 |
| 4,151,479 A | * | 4/1979 | Baba | 330/264 |
| 5,912,809 A | * | 6/1999 | Steigerwald et al. | 333/12 X |

FOREIGN PATENT DOCUMENTS

| | | | | |
|---|---|---|---|---|
| EP | 0 465 700 A1 | * | 1/1992 | H01F/27/08 |
| GB | 442099 | * | 11/1935 | 333/181 |
| JP | 1-74816 | * | 3/1989 | 333/181 |
| JP | 4-154203 | * | 5/1992 | 333/181 |

OTHER PUBLICATIONS

Sekhri, "Power Line Filter," Dec. 1974, IBM Technical Disclosure Bulletin, vol. 17, No. 7, pp. 1998–1999.*

* cited by examiner

Primary Examiner—Justin P. Bettendorf
(74) Attorney, Agent, or Firm—Ostrolenk, Faber, Gerb & Soffen, LLP

(57) ABSTRACT

Conductive EMI in motor drive circuits is reduced by interposing inductors in the ground line. The common mode current enters the motor drive circuit through the two supply leads and leaves the system through the ground lead. The ground current typically is very high frequency but very low in rms amperage. Interposing an induction (low current, very high L) in the ground line advantageously reduces EMI. The inventive method reduces.or eliminates the need for filtering capacitors across the rectifier of the motor drive circuit. In addition, the inventive method minimizes the common mode choke to merely a wraparound ferrite core over the input wires. EMI emissions are reduced further by sandwiching ground traces along with power traces and connecting to.the heat sink with the shortest possible route. This reduces the ground loop area, which consequently reduces emissions.

9 Claims, 4 Drawing Sheets

METHOD OF REDUCING CONDUCTED EMI IN MOTOR DRIVE APPLICATIONS

This application claims the benefit of U.S. Provisional application Serial No. 60/130,480 filed Apr. 22, 1999, the entire disclosure of which is incorporated herein by reference.

BACKGROUND OF THE INVENTION

1. Field of the Invention

The present invention relates to reducing conducted and radiated electromagnetic interference (EMI) in motor drive applications. More specifically, conducted and radiated EMI is reduced by interposing inductors in ground lines of motor drive circuits, and by arranging components on a printed circuit board to reduce the ground loop area.

2. Description of the Related Art

Legislation limits the amount of high frequency power permitted to be injected into a power supply line by, for example, a motor drive circuit. A known motor drive circuit 2 is illustrated in the block diagram of FIG. 1. Motor drive circuit 2 drives electric motor 4 and includes a rectifier section 6:and an inverter section 8. A capacitor 10 is connected across the connections between rectifier 6 and inverter 8. A heat sink 12 typically is required for inverter 8.

EMI reducing components are added to reduce the outgoing energy as shown in the block diagram of FIG. 2 showing motor drive circuit 20. A common mode filter 22 carries the main power current and thus needs to carry a large current. Consequently, filter 22 must be a large size, and consequently has a high cost. The function of this filter 22 is to reduce the common mode and differential mode current into the system. In addition, filtering capacitors 24, 26, and 27 are added across rectifier 6. No filtering is used in ground line 28.

Radiated EMI is generated in the ground connections between heat sinks and filter capacitors, for example. Typical layouts in which the filter capacitors and power switches are separately located, for example, yield high emissions due to long loops in ground traces.

SUMMARY OF THE INVENTION

The present invention provides reduced conducted and radiated EMI in motor drive applications. Conducted EMI is reduced by interposing an inductance in the ground line of a motor drive circuit. The common mode current enters the motor drive circuit through the two supply leads and leaves the system through the ground lead. The ground current typically is very high frequency but very low in rms amperage. Consequently, interposing an induction (low current, very high L) in the ground line advantageously reduces EMI.

Advantageously, the inventive method potentially reduces or eliminates the need for filtering capacitors.across the rectifier of the motor drive circuit. In addition, the inventive method potentially minimizes or eliminates the common mode choke.

Radiated EMI emissions are reduced by sandwiching ground traces along with power traces and connecting to the heat sink with the shortest possible route. This reduces the ground loop area, which consequently reduces emissions.

Other features and advantages of the present invention will become apparent from the following description of the invention which refers to the accompanying drawings.

DETAILED DESCRIPTION OF THE PREFERRED EMBODIMENTS

Figure 1:
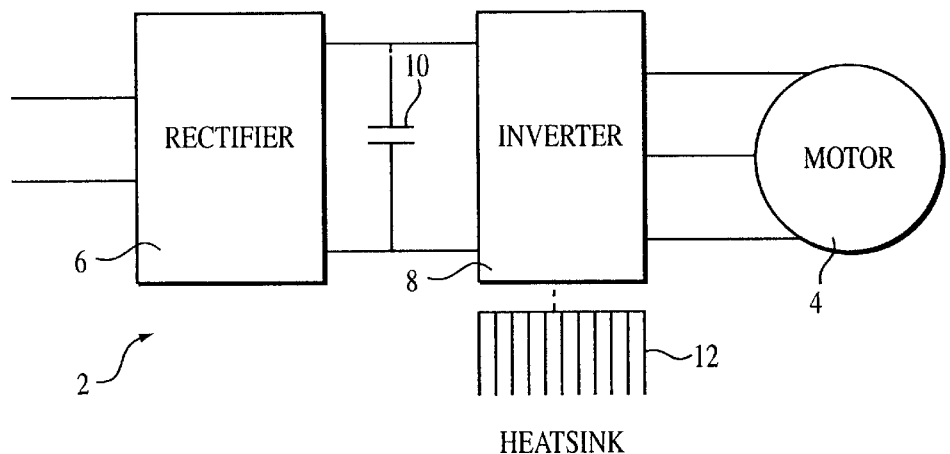
FIG. 1 is a block diagram of a motor drive circuit according to the prior art.
Figure 2:
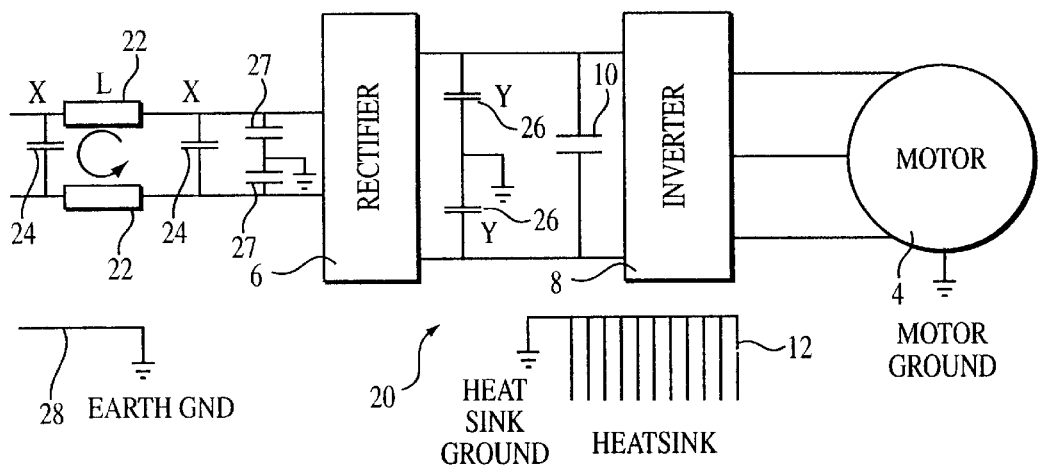
FIG. 2 is a block diagram of the motor drive circuit of FIG. 1 with EMI reduction according to the prior art.
Figure 3:
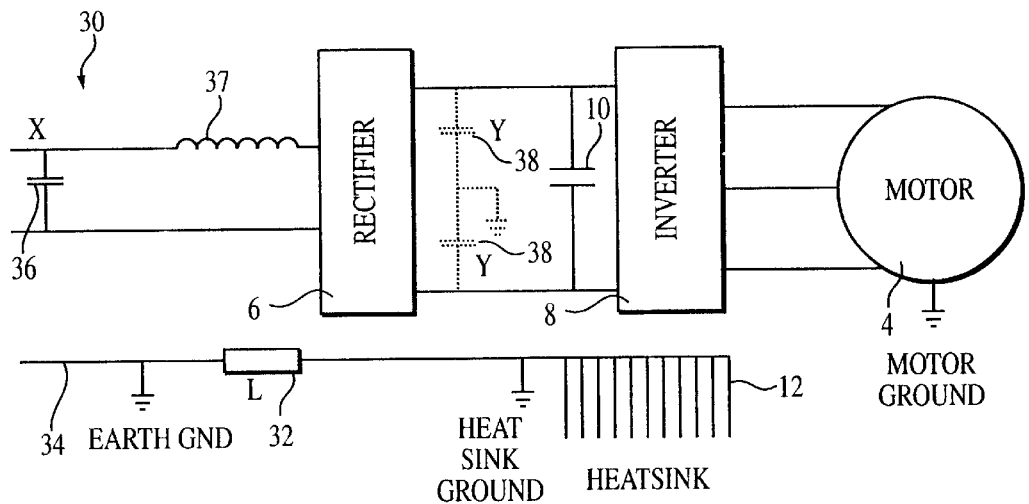
FIG. 3 is a block diagram of a motor drive circuit with EMI reduction according to the present invention.

Referring to FIG. 3, a block diagram of a motor drive circuit 30 with EMI reduction according to the present invention is shown. EMI filter 32 is interposed in the ground line 34 of circuit 30. As a result, while filter capacitor 36 may remain the same or require increased capacity as filter capacitors 24, filter capacitors 38 may be eliminated, and/or reduced in capacity as compared to the capacitors 26 and 27of the prior art circuit 20 shown in FIG. 2. A differential mode inductor 37 is inserted to limit the differential mode noise. This differential mode inductor can be small in size and thus has a low cost. In addition, EMI reduction according to the present invention minimizes or.eliminates the common mode choke 22.

Elimination of common mode filter 22 allows consolidation of the two capacitors 24 (see FIG. 2) into capacitor 36, if no common mode capacitor is required, which results in a less expensive and less bulky solution. Moreover, capacitor 36 is required to withstand lower voltage (as compared to capacitors 26 and 38, and hence is less expensive.

Figure 4:
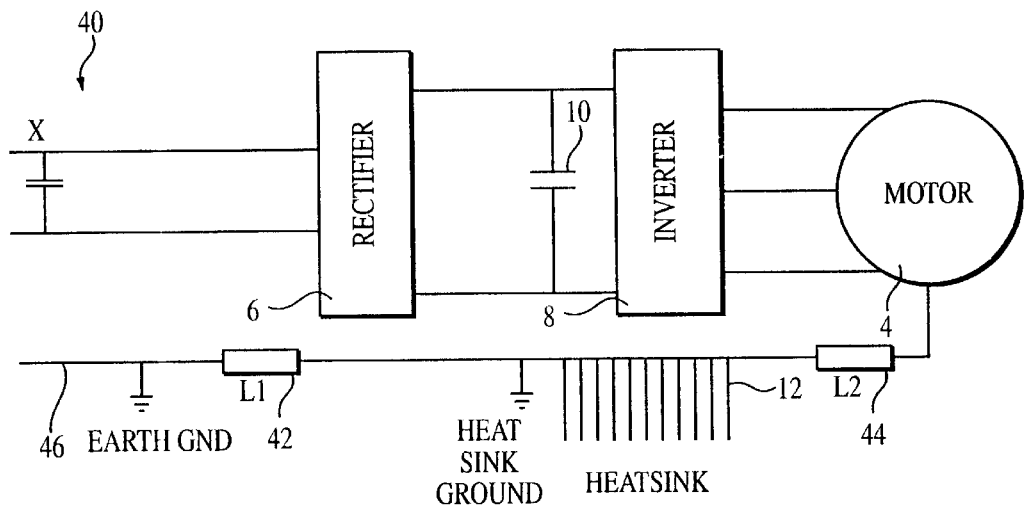
FIG. 4 is a block diagram of a motor drive circuit with EMI reduction according to an alternative embodiment of the present invention.

According to an alternative embodiment of the present invention, a second inductor may be added in the ground line that goes from the motor drive to the motor as shown in motor drive circuit 40 of FIG. 4. Consequently, by inserting inductors 42 and 44 in ground line 46 as shown, the high frequency currents flowing in this loop are reduced and the size and cost of the filtering components required in the circuits 20 and 30 of FIGS. 2 and 3 are reduced.

Reductions in radiated EMI are achieved according to the present invention by reducing the ground loop area on the printed circuit board. The connection made from the heat sink ground to the ground for capacitors 26, 27 and 38 as shown in FIGS. 2 and 3 respectively, can cause radiated EMI. The power devices are capacitively coupled to the heat sink. Current produced by the capacitive coupling flows to the capacitors and back to the heat sink connection.

Figure 5:
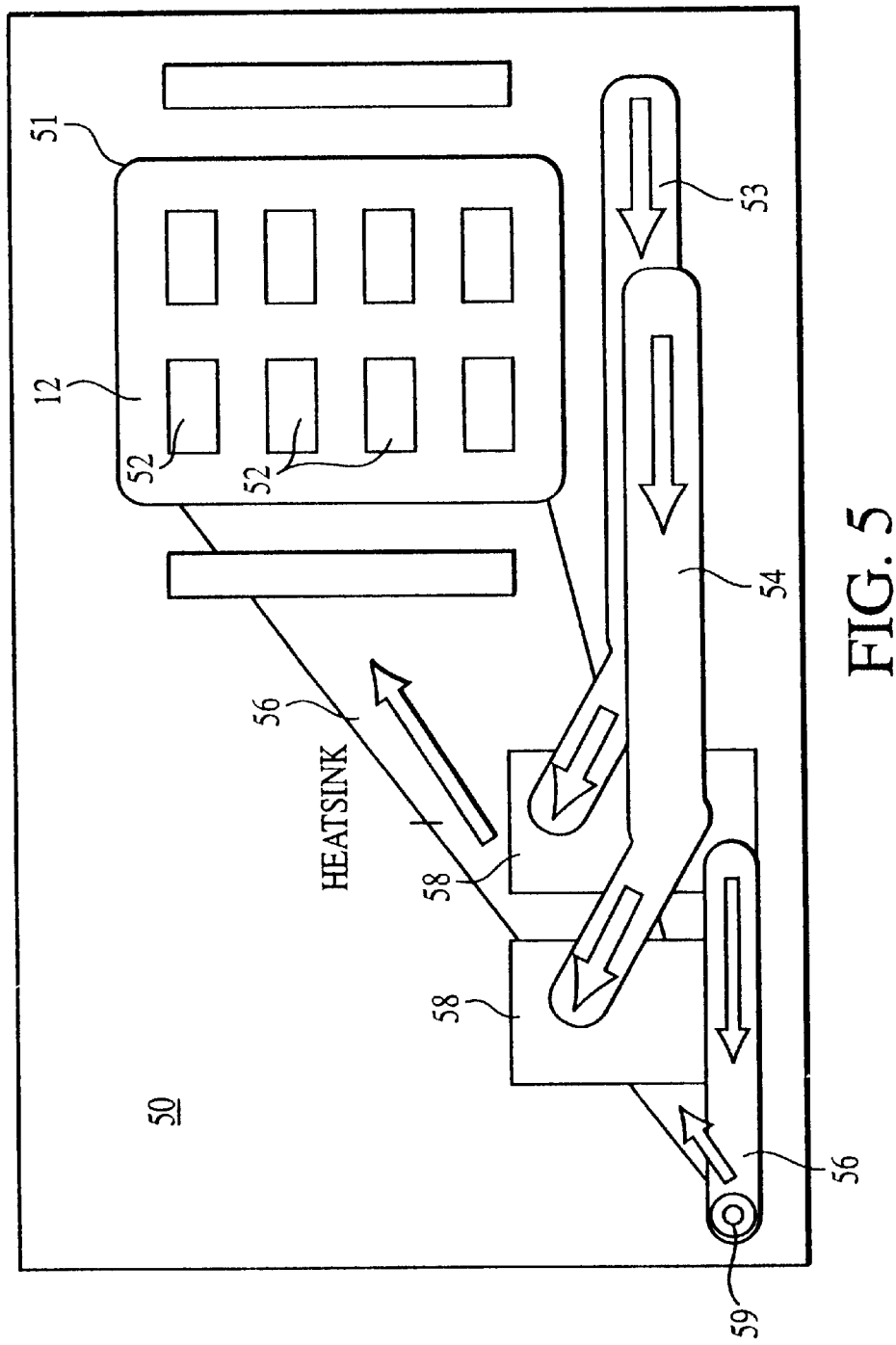
FIG. 5 is a schematic block diagram of a printed circuit board layout according to the prior art.

Referring to FIG. 5, a prior art circuit is shown in which currents travel along an extended loop, thus causing high emissions. FIG. 5 schematically illustrates a printed circuit board 50. A substrate 51 mounted on a heat sink (not shown) supports various device chips such as power switches 52. The power switches are capacitively coupled to the heat sink located underneath the power switches. Current traces on PCB 50 are represented as areas 53, 54, and 56. Current flows from an input to capacitors 58 along power traces 53 and 54. The loop continues along trace 56 by way of a heat sink grounding attachment such as screw 59. Trace 56 represents the heat sink ground current between capacitors 58 and heat sink 12. The extended area enclosed by the traces leads to increased radiated EMI.

According to the present invention, radiated EMI is reduced by sandwiching the ground trace along with the power traces and connecting the sandwiched traces to the heat sink with the shortest possible route. The ground connection can be achieved by various known methods, using screws, wirebond, clips, pressure contact, or other means of attachment to the PCB. In addition, the device is laid out so as to locate capacitors closer to the heat sink. A preferred layout according to the present invention is shown in FIG. 6.

Figure 6:
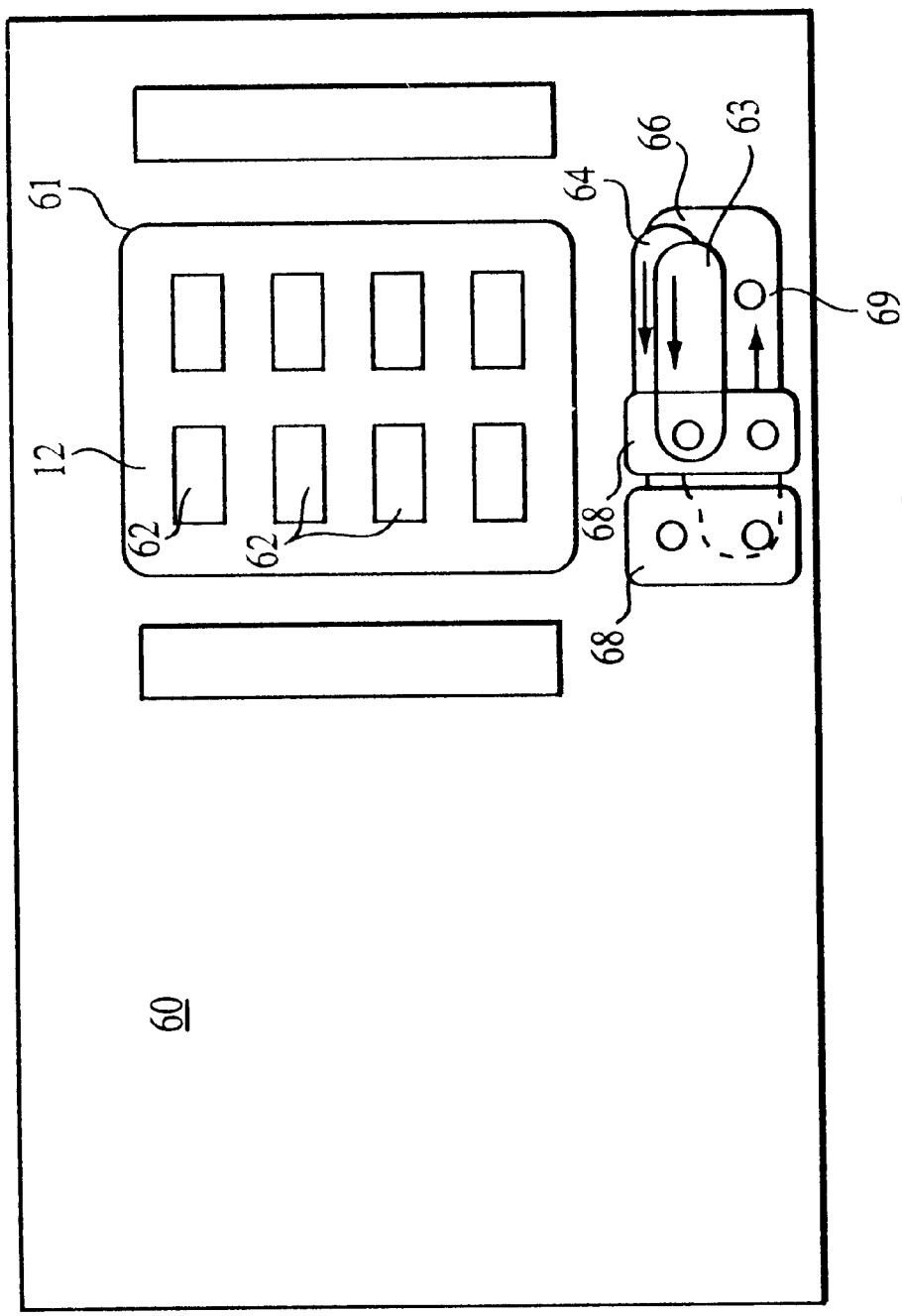
FIG. 6 is a schematic block diagram of a printed circuit board layout according to the present invention.

Referring to FIG. 6, printed circuit board 60 is illustrated schematically. A substrate 61 mounted on a heat sink (not shown) supports various device chips 62. Current traces 63, 64, and 66 are shown with corresponding directional arrows. Ground trace 66 between capacitors 68 and heat sink ground connection 69 is sandwiched between power traces 63 and 64. Preferably, the ground trace overlaps both of the power traces by 20% or more. Higher percentages of overlap result in increased reduction of radiated EMI.

Further, by positioning the capacitors 68 closer to the substrate 61, the ground trace is connected to the heat sink using the shortest possible route. Consequently, the ground loop area is reduced, along with radiated EMI.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A motor drive circuit having reduced EMI, comprising:
    an inverter having a pair of supply leads and being connectable to a motor for driving the motor;
    an earth ground for providing a common reference for the motor drive circuit;
    a heat sink thermally coupled to the inverter and having a heat sink ground separate from the earth ground; and
    an inductor connected in series between the heat sink ground and the earth ground, whereby high frequency common mode current conducted in the motor drive circuit is reduced.

2. The circuit of claim 1, further comprising:
    a motor ground separate from the earth ground and the heat sink ground; and
    a further inductor connected in series between the heat sink ground and the motor ground.

3. The circuit of claim 1, further comprising a printed circuit board on which the motor drive circuit is laid out, and a ground trace overlapped by a power trace on the printed circuit board.

4. The circuit of claim 3, wherein at least 20% of the ground trace and the power trace overlap.

5. The circuit of claim 1, further comprising a differential mode inductor connected in series in one of the pair of supply leads.

6. The circuit of claim 1, further comprising a rectifying circuit, and a pair of capacitors series connected across the rectifying circuit, wherein the pair of capacitors are connected to the heatsink and the earth ground.

7. A motor drive circuit having reduced EMI, comprising:
    an inverter having a pair of supply leads and being connectable to a motor for driving the motor;
    a printed circuit board on which the motor drive circuit is laid out, the printed circuit board including at least two power traces and a ground trace disposed between the two power traces, wherein the ground trace overlaps at least a portion of each of the at least two power traces, the at least two power traces and the ground trace are substantially coterminous to reduce the EMI by minimizing the area covered by the traces, a first capacitor is connected between one of the power traces and the ground trace and a second capacitor is connected to the other power trace and the ground trace, and the traces and said capacitors are disposed adjacent the inverter;
    a heat sink thermally coupled to the inverter and having a heat sink ground on the printed circuit board; and
    the heat sink ground being located proximate to the heat sink to shorten a ground path between the heat sink and the heat sink ground, and the heat sink ground connected to the ground trace.

8. The circuit of claim 7 wherein the ground trace overlaps 20% of the area of each of the at least two power traces.

9. The circuit of claim 7 wherein the inverter is disposed on a substrate, the substrate being in thermal contact with the heat sink.

* * * * *